(12) United States Patent
Hu et al.

(10) Patent No.: US 12,502,628 B2
(45) Date of Patent: Dec. 23, 2025

(54) NATURAL GAS SEPARATION DEVICE

(71) Applicant: SOUTHWEST PETROLEUM UNIVERSITY, Sichuan (CN)

(72) Inventors: Shuyong Hu, Chengdu (CN); Yang Hu, Chengdu (CN); Wei Liao, Chengdu (CN); Shijie Zhang, Chengdu (CN); Yunxin Zhang, Chengdu (CN); Jiayi Zhang, Chengdu (CN); Ji Zhang, Chengdu (CN); Xinzhe Liu, Chengdu (CN); Xu Dong, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 257 days.

(21) Appl. No.: 18/398,356

(22) Filed: Dec. 28, 2023

(65) Prior Publication Data
US 2024/0299871 A1 Sep. 12, 2024

(30) Foreign Application Priority Data
Mar. 7, 2023 (CN) .......................... 202310210284.6

(51) Int. Cl.
*B01D 45/14* (2006.01)
*B01D 45/08* (2006.01)
(Continued)

(52) U.S. Cl.
CPC ............. *B01D 45/08* (2013.01); *B01D 45/14* (2013.01); *B01D 45/18* (2013.01); *C10L 3/101* (2013.01)

(58) Field of Classification Search
CPC ........ B01D 45/08; B01D 45/14; B01D 45/18; C10L 3/101; C10L 3/10; Y02T 10/30
See application file for complete search history.

(56) References Cited

U.S. PATENT DOCUMENTS

| 5,562,758 A * | 10/1996 | Awaji .................. B01D 46/681 55/300 |
| 2001/0010189 A1* | 8/2001 | Conrad ................. A47L 9/1683 95/271 |

(Continued)

FOREIGN PATENT DOCUMENTS

| CN | 201454344 U | 5/2010 |
| CN | 103566698 B | 11/2015 |

(Continued)

OTHER PUBLICATIONS

First Office Action in Chinese Application No. 202310210284.6 mailed on Mar. 1, 2025, 16 pages.
(Continued)

*Primary Examiner* — Dung H Bui
(74) *Attorney, Agent, or Firm* — PORUS IP LLC

(57) ABSTRACT

Embodiments of the present disclosure provide a natural gas separation device, the device comprising a tank, providing with an air inlet, an exhaust port, and a liquid discharge port; a liquid separation assembly, disposed in the tank and dividing an internal space of the tank into a front separation chamber and a liquid recovery chamber, the liquid separation assembly being provided with a liquid return channel for connecting the front separation chamber and the liquid recovery chamber; and a solid separation assembly, disposed in the front separation chamber and connected to the liquid separation assembly.

4 Claims, 7 Drawing Sheets

(51) Int. Cl.
*B01D 45/18* (2006.01)
*C10L 3/10* (2006.01)

(56) References Cited

U.S. PATENT DOCUMENTS

| | | | | |
|---|---|---|---|---|
| 2003/0000186 | A1* | 1/2003 | West | B01D 45/14 55/455 |
| 2005/0060970 | A1* | 3/2005 | Polderman | B01D 45/16 55/320 |
| 2008/0047239 | A1* | 2/2008 | Zheng | B04C 5/13 55/428 |
| 2013/0247764 | A1* | 9/2013 | Kvamsdal | B04C 3/06 96/208 |
| 2018/0221800 | A1* | 8/2018 | Konijn | B01D 45/16 |
| 2019/0111374 | A1* | 4/2019 | Burton | B01D 46/0005 |
| 2020/0001309 | A1* | 1/2020 | Kvamsdal | B04C 5/14 |
| 2022/0072460 | A1* | 3/2022 | Gao | B01D 46/0005 |

FOREIGN PATENT DOCUMENTS

| | | |
|---|---|---|
| CN | 217887246 U | 11/2022 |
| CN | 218421831 U | 2/2023 |

OTHER PUBLICATIONS

Decision to Grant a Patent in Chinese Application No. 202310210284.6 mailed on Jun. 23, 2025, 4 pages.
Three-phase separator, Web page <https://m.bipt.edu.cn/jscl/sxfl/index.htm>, 2024, 15 pages.

\* cited by examiner

NATURAL GAS SEPARATION DEVICE

CROSS-REFERENCE TO RELATED APPLICATION

This application claims priority of Chinese Patent Application No. 202310210284.6, filed on Mar. 7, 2023, the entire contents of which are incorporated herein by reference.

TECHNICAL FIELD

The present disclosure relates to the technical field of natural gas treatment, and in particular, to a natural gas separation device.

BACKGROUND

Natural gas is a mixture of hydrocarbon and non-hydrocarbon gases naturally found in underground formations. Hydrocarbons dominate its composition, but it also contains non-hydrocarbon gases. Natural gas has extensive applications and can be used as a clean fuel, a chemical raw material, etc. Natural gas is found in various underground porous rock formations, including oil field gas, gas field gas, coal bed methane, and natural gas underground storage. After extraction, natural gas needs to be transported through pipelines. Impurities in the gas can accelerate the corrosion of pipelines and equipment, thereby reducing the efficiency of pipeline transportation. Therefore, it is necessary to remove impurities from natural gas.

In existing natural gas purification devices, the natural gas enters the device directly through an air inlet. During this process, solid impurities in the natural gas exert strong impact forces, which damages the filtration and separation structure of the natural gas purification devices and affect the filtration effect.

Therefore, there is a need for a natural gas separation device that can mitigate the damage caused by natural gas to the filtration and separation structure, and achieve effective separation of natural gas.

SUMMARY

One of the embodiments of the present disclosure provides a natural gas separation device, comprising: a tank, providing with an air inlet, an exhaust port, and a liquid discharge port; a liquid separation assembly, disposed in the tank and dividing an internal space of the tank into a front separation chamber and a liquid recovery chamber, the liquid separation assembly being provided with a liquid return channel for connecting the front separation chamber and the liquid recovery chamber; and a solid separation assembly, disposed in the front separation chamber and connected to the liquid separation assembly.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

Figure 1:
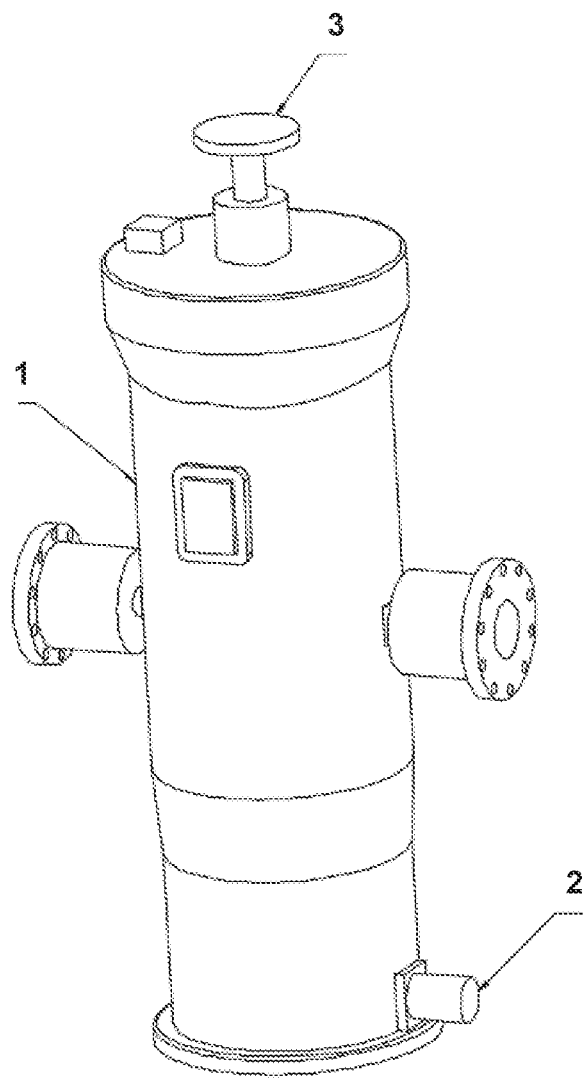
FIG. 1 is a schematic structural diagram of a natural gas separation device according to some embodiments of the present disclosure.

Markings and corresponding component names in the accompanying drawings:
  1—tank, 11—liquid recovery chamber, 12—front separation chamber, 2—air inlet, 3—exhaust port, 31—sensing system, 4—liquid separation assembly, 41—liquid separation connection base, 411—liquid return channel, 412—diversion chamber, 42—diversion channel, 43—liquid separation cartridge base, 44—liquid separation cartridges, 441—support column, 442—delayed diversion member, 5—solid separation assembly, 51—solid separation connection base, 511—guide groove, 52—solid separation cartridge base, 521—guide rib, 53—solid cartridge, 54—buffer assembly, 6—droplet capture assembly, 61—capturing disk, 62—droplet capturing vanes, 63—drive motor, 64—drive member, 7—liquid discharge port, 71—blowdown valve, 8—baffle plate, 9—driving device.

DETAILED DESCRIPTION

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

Figure 2:
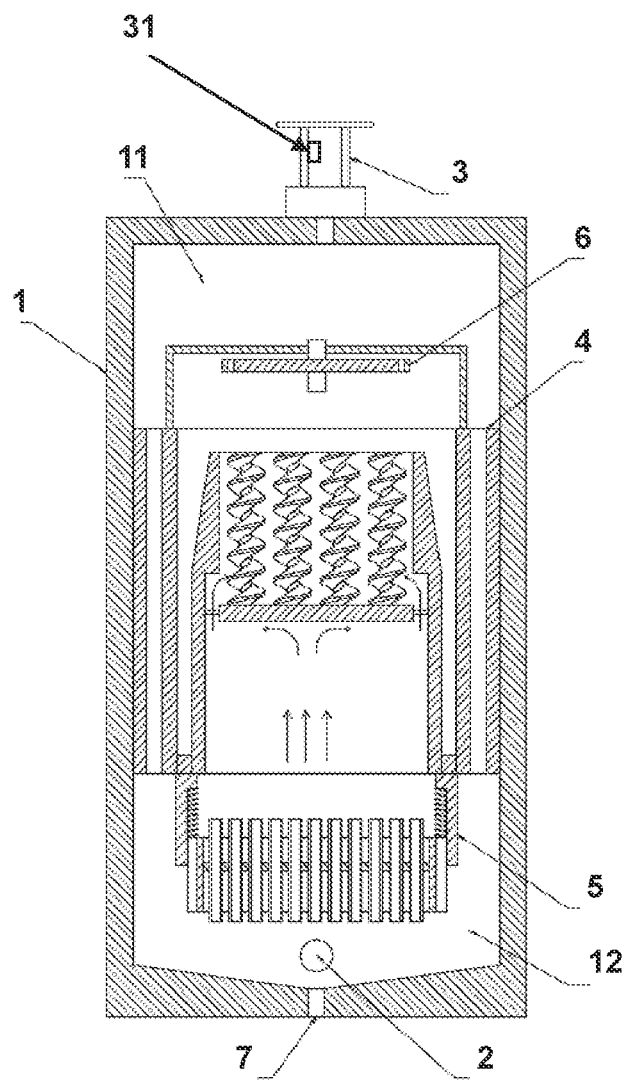
FIG. 2 is a schematic diagram of a cross-sectional structure of a natural gas separation device according to some embodiments of the present disclosure.

FIG. 1 is a schematic structural diagram of a natural gas separation device according to some embodiments of the present disclosure. FIG. 2 is a schematic diagram of a cross-sectional structure of a natural gas separation device according to some embodiments of the present disclosure.

In some embodiments, as shown in FIGS. 1 and 2, the natural gas separation device includes a tank 1, a liquid separation assembly 4, and a solid separation assembly 5. The tank 1 is provided with an air inlet 2, an exhaust port 3, and a liquid discharge port 7. The liquid separation assembly 4 is disposed in the tank 1 and divides an internal space of the tank 1 into a front separation chamber 12 and a liquid recovery chamber 11. The liquid separation assembly 4 is provided with a liquid return channel 411 (referring to FIG. 3) that connects the front separation chamber 12 and the liquid recovery chamber 11. In some embodiments, the liquid recovery chamber 11 is connected to the exhaust port 3, and the front separation chamber 12 is connected to both the air inlet 2 and the liquid discharge port 7. In some embodiments, the solid separation assembly 5 is disposed in the front separation chamber 12 and connected to the liquid separation assembly 4. The solid separation cartridge of the solid separation assembly 5 is provided with a buffer assembly 54. The buffer assembly 54 stores energy when the solid separation cartridge is impacted in a filtration direction of the solid separation cartridge.

In some embodiments, an overall shape of the tank 1 may be a hollow cylindrical shape, and the overall shape of the tank 1 may be set to other shapes as desired.

The air inlet 2 is an opening structure through which natural gas enters an interior of the tank 1, and the exhaust port 3 is an opening structure through which natural gas exits the interior of the tank 1. In some embodiments, as shown in FIG. 1, the air inlet 2 is disposed near one end on a sidewall of the tank 1, and the exhaust port 3 is disposed on the other end of the tank 1. In some embodiments, the air inlet 2 and the exhaust port 3 may be configured with an inlet valve and an exhaust valve, respectively, to control the flow of gas.

The liquid discharge port 7 is an opening structure for discharging the liquid separated from the natural gas out of the tank 1. In some embodiments, the liquid discharge port 7 is disposed on an end of the tank 1, and a chamber wall of the tank 1 near the liquid discharge port 7 may be shaped like a cone, with the liquid discharge port 7 disposed at a center of the cone. This arrangement facilitates the discharge of solid impurities or liquid from the front separation chamber 12. In some embodiments, the liquid discharge port 7 may be removably connected to other sealed containers to enable the collection of the solid impurities or liquid.

Figure 3:
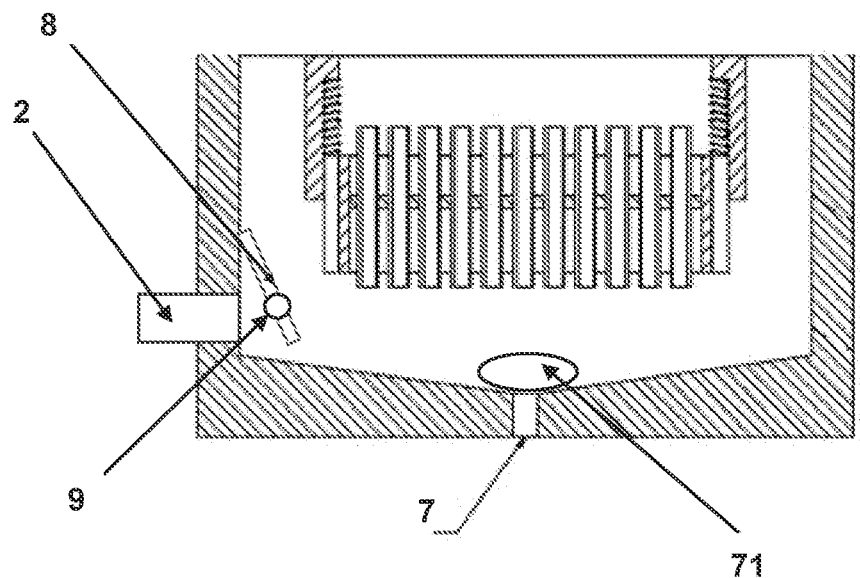
FIG. 3 is another schematic diagram of a cross-sectional structure of a natural gas separation device according to some embodiments of the present disclosure.

FIG. 3 is another schematic diagram of a cross-sectional structure of a natural gas separation device according to some embodiments of the present disclosure.

In some embodiments, merely by way of example, as shown in FIG. 3, the liquid discharge port 7 is provided with a blowdown valve 71.

The blowdown valve is a device for opening or closing the liquid discharge port 7. In some embodiments, when natural gas is passed through the air inlet 2, the blowdown valve is closed, which causes the natural gas to flow through the solid separation assembly 5 and the liquid separation assembly 4. The solid separation assembly 5 is an assembly for separating solid impurities from the natural gas; and the liquid separation assembly 4 is an assembly for separating liquid from the natural gas.

The front separation chamber 12 is a chamber structure for placing solid impurities and liquid separated from the natural gas. In some embodiments, when there is an excessive amount of solid impurities and liquid stored in the front separation chamber 12, the flow of natural gas is stopped, and then the blowdown valve is opened to discharge the solid impurities and liquid out of the tank 1.

In some embodiments, the blowdown valve 71 is a float type automatic blowdown valve, and the float type automatic blowdown valve is provided above the liquid discharge port 7. The float type automatic blowdown valve may automatically control the opening and closing of the valve according to the rise and fall of a liquid level inside the tank.

In some embodiments, the float type automatic blowdown valve includes a float, a valve core, and other components.

The float is an assembly capable of rising and falling in response to changes in the liquid level of the front separation chamber 12; the valve core is an assembly for controlling whether or not the liquid discharge port 7 is connected to the outside of the tank 1. In some embodiments, the liquid and solid impurities separated from the natural gas may enter the front separation chamber 12, the float may rise with the increase of the liquid in the front separation chamber 12, and when the float rises to a preset height, the float may drive the movement of the valve core through a mechanical connecting device (e.g., a valve stem, a rotary axis, etc.) to control the liquid discharge port 7 to connect to the outside of the tank 1. At this time, the liquid and solid impurities in the front separation chamber 12 may be discharged from the tank 1 through the liquid discharge port 7. The preset height may be predetermined based on historical experience, priori knowledge or a structural dimension of the mechanical connecting device.

In some embodiments, a top of the float type automatic blowdown valve is in a form of a convex curved shape. For example, the convex surface shape may be a cone, a dome, etc. In some embodiments, by setting the top of the float type automatic blowdown valve in a form of a convex curved shape, liquid and solid impurities that fall into the float type automatic blowdown valve may flow along an edge of the top, which prevents the accumulation of liquid and solid impurities on the top of the float type automatic blowdown valve.

In some embodiments, when liquid and solid impurities accumulate to a certain extent in the front separation chamber 12, the rise of the liquid level may drive the float to rise, so as to control the connection between the liquid discharge port 7 and the outside and automatically discharge liquid and solid impurities. The float type blowdown valve is able to automatically control the connectivity of the liquid discharge port 7 with the outside according to the change of the liquid level, so as to control the liquid in the front separation chamber 12 at an appropriate liquid level, continuously discharge the liquid and solid impurities, and improve the efficiency of the discharge.

In some embodiments, the filtration direction of the solid separation assembly 5 is a direction in which the natural gas flows through the solid separation assembly 5, and the filtration direction of the solid separation assembly 5 may be set in various forms. For example, the filtration direction of the solid separation assembly 5 may be set to be the same or different from the extension direction of the air inlet 2. It should be noted that solid impurities themselves follow the natural gas in its movement, as long as natural gas may flow through the solid separation component 5. In some embodiments, when the solid impurities separated from the natural gas impact the solid separation cartridge, the buffer assembly 54 then provides a buffering force for the solid separation cartridge, thereby reducing the impact of the solid impurities on the solid separation cartridge and realizing the protection of the solid separation cartridge. More on the buffer assembly 54 may be found below.

In some embodiments, when the natural gas separation device operates, the natural gas enters the front separation chamber 12 through the air inlet 2 and passes through the solid separation cartridge to separate solid impurities therefrom, and the natural gas after separating solid impurities enters the liquid separation assembly 4 to separate the water therefrom, and the separated water may condense into one or more droplets. In some embodiments, the natural gas after separating water may carry a portion of the droplets into the liquid recovery chamber 11, at which the droplets fall downward under gravity and the natural gas is discharged through the exhaust port 3.

Figure 4:
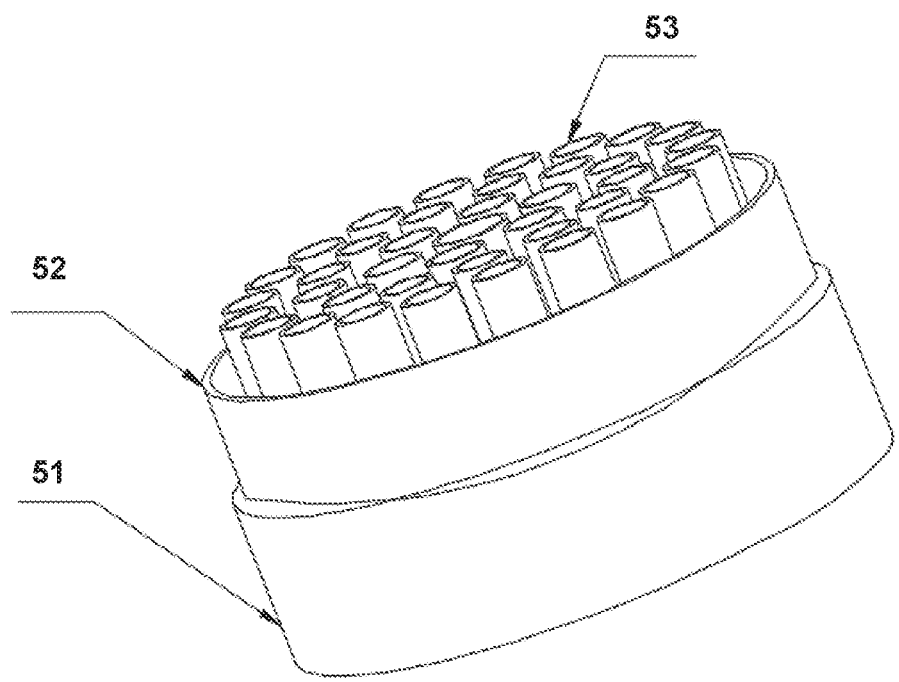
FIG. 4 is a schematic diagram of a structure of a solid separation assembly according to some embodiments of the present disclosure.
Figure 5:
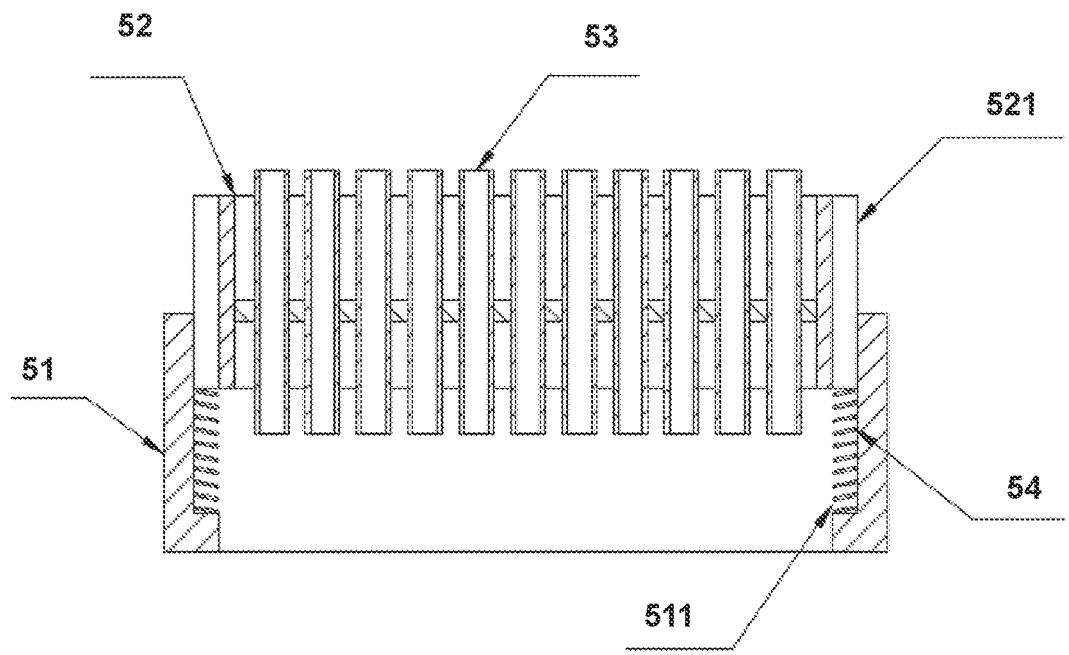
FIG. 5 is a schematic diagram of a cross-sectional structure of the solid separation assembly according to some embodiments of the present disclosure.

FIG. 4 is a schematic diagram of a structure of a solid separation assembly according to some embodiments of the present disclosure. FIG. 5 is a schematic diagram of a cross-sectional structure of a solid separation assembly according to some embodiments of the present disclosure.

In some embodiments, referring to FIGS. 2 to 5, the solid separation assembly 5 includes a solid separation connection base 51 and a solid separation cartridge base 52. The solid separation connection base 51 is connected to the liquid separation assembly 4. The solid separation cartridge base 52 is slidably connected to the solid separation connection base 51, and a buffer assembly 54 is provided between the solid separation connection base 51 and the solid separation cartridge base 52. The solid separation cartridge is disposed on the solid separation cartridge base 52.

The solid separation connection base 51 may serve as a base for the solid separation assembly 5 and is connected to the solid separation cartridge base 52. In some embodiments, the solid separation connection base 51 may be provided in a variety of feasible shapes (e.g., cylindrical). In some embodiments, one end of the solid separation connection base 51 along its axial direction may be connected to the liquid separation assembly 4 based on a plurality of connections.

The solid separation cartridge base 52 may be used as a base for mounting the solid cartridge 53 and is connected to the solid separation connection base 51. In some embodiments, the solid separation cartridge base 52 may be provided in the same shape (e.g., cylindrical) as the solid separation connection base 51 and coaxially socketed in the solid separation connection base 51. In some embodiments, a plurality of guide ribs 521 axially parallel to the solid separation cartridge base 52 may be disposed on an outer side wall of the solid separation cartridge base 52, and a plurality of guide grooves 511 may be disposed on an inner wall of the solid separation connection base 51. The position and shape of the guide grooves 511 correspond to the guide ribs 521, and through the cooperation of the guide grooves 511 and the guide ribs 521, the solid separation connection base 51 is slidingly connected to the solid separation cartridge base 52.

The buffer assembly 54 is an assembly for cushioning an impact force generated by solid impurities. In some embodiments, the buffer assembly 54 includes a spring, which may be disposed in the guide groove 511, the axis of the spring is parallel to the extension direction of the guide groove 511, and one end of the spring is fixedly connected to a groove wall of the guide groove 511, and the other end is fixedly connected to the guide rib 521. In some embodiments, the spring may provide a force in an opposite direction to the solid separation cartridge base 52 when the solid separation cartridge base 52 slides relative to the solid separation connection base 51. For example, when the solid separation cartridge is impacted, the solid separation cartridge drives the solid separation cartridge base 52 to slide relative to the solid separation connection base 51 so that the spring is in a state of compression, at which time the spring stores energy while buffering the impact of the solid impurities, realizing the protection of the solid separation cartridge. In some embodiments, the buffer assembly 54 may also be replaced with an elastic device such as a hydraulic telescoping rod, a spring-loaded telescoping rod, or the like.

In some embodiments, an elastic sliding connection between the solid separation connection base 51 and the liquid separation assembly 4 may be realized by means of an elastic device. For example, a plurality of sliding rods are vertically disposed at an end of the solid separation connection base 51, a plurality of sliding holes adapted to the sliding rods are provided on the liquid separation assembly 4, a restriction structure is provided between the sliding rods and the sliding holes, and the sliding rods are provided with springs. In some embodiments, when the solid impurities generate an excessive impact force on the solid separation cartridge, further buffering may be realized by the elastic device between the solid separation connection base 51 and the liquid separation assembly 4 to cut down the impact of the solid impurities on the solid separation cartridge and realize the protection of the solid separation cartridge.

Figure 6:
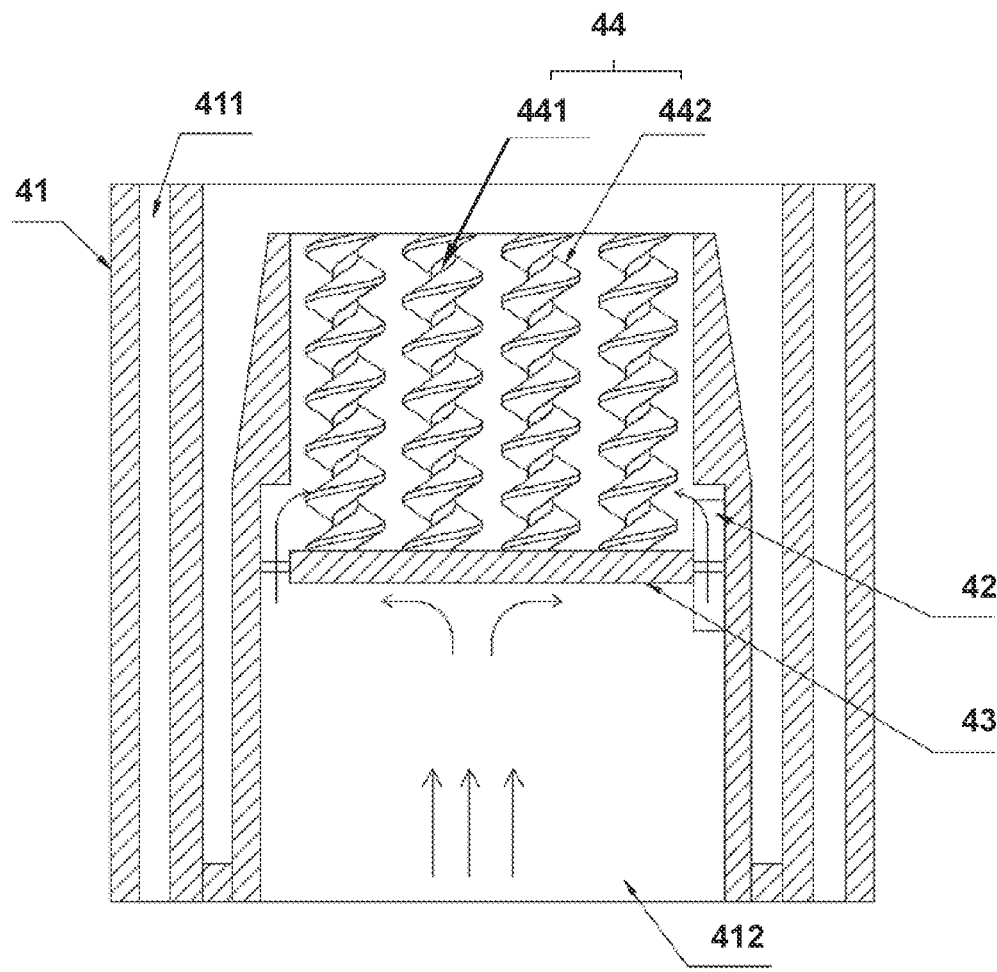
FIG. 6 is a schematic diagram of a cross-sectional structure of a liquid separation assembly according to some embodiments of the present disclosure.

FIG. 6 is a schematic diagram of a cross-sectional structure of a liquid separation assembly according to some embodiments of the present disclosure.

In some embodiments, as shown in FIG. 2 and FIG. 6, the liquid separation assembly 4 includes a liquid separation connection base 41, a liquid separation cartridge base 43, and a plurality of liquid separation cartridges 44. The liquid separation connection base 41 is connected to the tank 1 and provided with a diversion chamber 412 connected to the front separation chamber 12 and the liquid recovery chamber 11. The liquid separation cartridges 44 are disposed on the liquid separation cartridge base 43. The liquid separation cartridge base 43 is connected to the liquid separation connection base 41 and disposed in the diversion chamber 412. A gap is disposed between the liquid separation cartridge base 43 and the liquid separation connection base 41 to form a diversion channel 42 for directing natural gas to the liquid separation cartridges 44.

The liquid separation connection base 41 is a placement assembly that connects the liquid separation assembly 4 to the tank 1. In some embodiments, the liquid separation connection base 41 may be provided in a variety of shapes (e.g., a cylinder), the liquid separation connection base 41 may be arranged coaxially with the tank 1, and the outer wall of the liquid separation connection base 41 may be adhered to the inner wall of the tank 1 to ensure sealing.

The liquid return channel 411 is a structure for returning droplets separated from natural gas. In some embodiments, a plurality of liquid return channels 411 are disposed on the liquid separation connection base 41 in a circumferential direction and parallel to the axis of the liquid separation connection base 41. In some embodiments, the liquid return channels 411 connect the liquid recovery chamber 11 to the front separation chamber 12.

The diversion chamber 412 is a chamber aperture structure that diverts the droplets separated from the natural gas to the liquid recovery chamber 11. In some embodiments, the diversion chamber 412 may be provided with multiple forms of holes, e.g., a single hole, a hole with a filter membrane, a stepped hole, etc. In some embodiments, the diversion chamber 412 is configured as a stepped hole, wherein the stepped hole includes a large-diameter hole and a small-diameter hole, with an aperture of the large-diameter hole being greater than that of the small-diameter hole. The large-diameter hole is adjacent to the front separation chamber, while the small-diameter hole is adjacent to the liquid recovery chamber 11. The liquid separation cartridge 44 is disposed in the small-diameter hole, and the liquid separation cartridge base 43 is disposed in the large-diameter hole. That is, a portion of the structure of the liquid separation cartridge 44 extends out from the small-diameter hole and is located in the large-diameter hole. In some embodiments, the liquid separation cartridge base 43 may be provided in a variety of feasible shapes. For example, the liquid separation cartridge base 43 may be in the form of a disk with a diameter equal to the diameter of the small-diameter hole, so that a gap may be formed between the liquid separation cartridge base 43 and the inner wall of the liquid separation connection base, and at the same time, since the diameter of the liquid separation cartridge base 43 is equal to the diameter of the small-diameter hole, the liquid separation cartridge base 43 may block natural gas flowing vertically upward, i.e., the natural gas needs to pass through the gap between the liquid separation cartridge base 43 and the liquid separation connection base before entering the liquid separation cartridge 44.

In some embodiments, after the natural gas is blocked by the liquid separation cartridge base 43, the natural gas may be subjected to a deceleration effect, resulting in a decreased flow rate, which leads to a longer residence time for the natural gas in the liquid separation cartridge 44, thereby enhancing the separation effect of the water and achieving more thorough separation of water from the natural gas.

In some embodiments, a one-way valve may be configured in the liquid return channel 411 to ensure that the natural gas in the front separation chamber 12 enters the liquid recovery chamber 11 only through the liquid separation assembly 4.

As shown in FIG. 6, in some embodiments, each of the liquid separation cartridges 44 includes a support column 441 and a delayed diversion member 442. The support column 441 is disposed on the liquid separation cartridge base 43, and the delayed diversion member 442 is disposed on the support column, and the delayed diversion member 442 includes a delayed diversion groove with a non-linear extension direction.

The support column 441 is a structure for supporting the liquid separation cartridge 44. In some embodiments, the support column may be removably connected (e.g., threaded) to the separation cartridge base for ease of cleaning. The support column may be set up as a cylindrical member or other various shaped member. The axis of the support column is arranged in parallel with the axis of the liquid separation cartridge base 43, i.e., the support column is vertically connected to the liquid separation cartridge base 43.

The delayed diversion member 442 is a member for diverting the natural gas to the delayed diversion groove. The delayed diversion groove is an open groove for extending a travel distance of the natural gas. In some embodiments, the arrangement manner and position of the delayed diversion member 442 on the support column is not limited herein, and the delayed diversion member 442 may allow the natural gas to enter the delayed diversion groove. For example, the delayed diversion member may be provided as variously shaped projections. In some embodiments, the extension direction of the delayed diversion groove is entirely upward, that is, the natural gas may achieve a height climb after being guided through the delayed diversion groove.

In some embodiments, the extension direction of the delayed diversion groove may be provided as a spiral line, and the axis of the spiral line may coincide with the axis of the support column, and the natural gas enters the delayed diversion groove and then travels upward along the extension direction of the delayed diversion groove. Under the same height of climb, the spiral-shaped delayed diversion groove can maximize the length of the flow path of the natural gas, allowing the natural gas to have more contact time with the groove wall of the delayed diversion groove. As a result, water in the natural gas may condense more on the inner wall of the delayed diversion groove, promoting the separation of water in the natural gas. In some embodiments, after the water in the natural gas condenses into droplets on the groove wall of the delayed diversion groove, the droplets may leave the delayed diversion groove and enter the liquid recovery chamber 11 under the carry-off of the natural gas. Most of the droplets entering the liquid recovery chamber 11 may fall down into the liquid return channel 411 by their own gravity without being discharged through the exhaust port 3 along with the natural gas.

It should be noted that the natural gas does not rise vertically under the guidance of the delayed diversion groove, so most of the droplets do not fall vertically and freely but are scattered around the liquid separation assembly 4 in a parabolic path.

The liquid separation cartridge 44 is a cartridge for separating the liquid from the natural gas. In some embodiments, there may be a plurality of liquid separation cartridges 44 evenly distributed on the liquid separation base. Due to the delayed diversion groove being a groove and not a closed channel, the natural gas may detach from the delayed diversion groove after entering it. The detached natural gas may then enter the delayed diversion groove of other liquid separation cartridges 44 to continue the separation of water in the natural gas, thereby achieving effective the separation of water from the natural gas.

Figure 7:
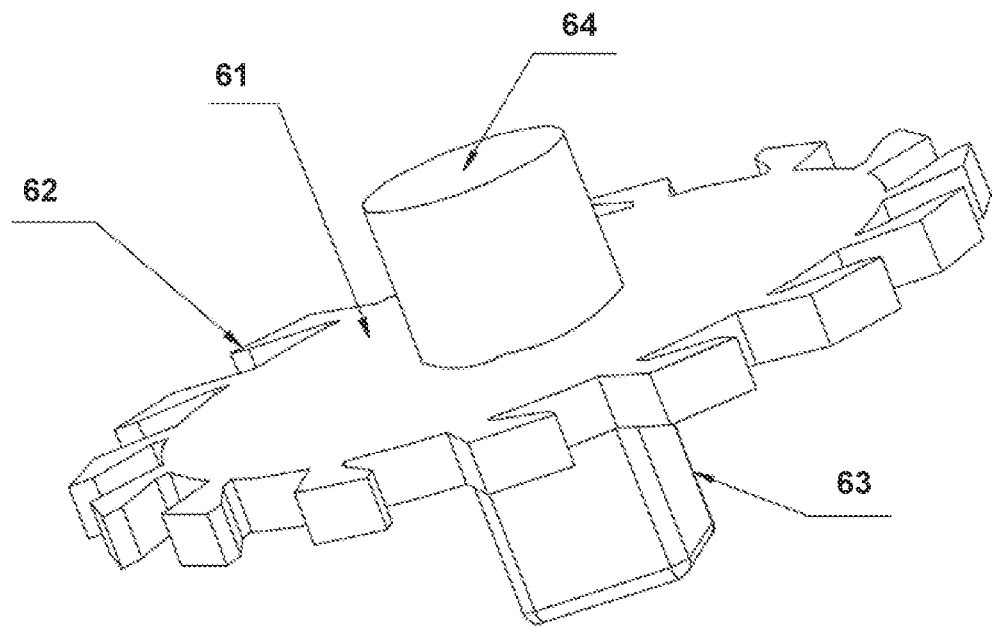
FIG. 7 is a schematic diagram of a structure of a droplet capture assembly according to some embodiments of the present disclosure.

FIG. 7 is a schematic diagram of a structure of a droplet capture assembly according to some embodiments of the present disclosure.

In some embodiments, referring to FIGS. 2 and 7, the natural gas separation device further includes a droplet capture assembly 6, the droplet capture assembly 6 is disposed in the liquid recovery chamber 11, and the droplet capture assembly 6 is connected to the tank 1. In some embodiments, the droplet capture assembly includes a capturing disk, and the capturing disk rotates to throw captured droplets onto a chamber wall of the liquid recovery chamber.

The droplet capture assembly 6 is an assembly for capturing droplets separated from the natural gas. In some embodiments, by the provision of the droplet capture assembly 6, a small portion of droplets may be prevented from falling vertically back into the liquid separation cartridge 44 and affecting water separation of the natural gas. In some embodiments, the droplets may fall vertically due to rebound after hitting the capturing disk 61, at which time an accumulation tray may be disposed on the top of the support column, and an accumulation chamber may be disposed on the accumulation tray to collect the droplets that are rebounded back to prevent them from entering into the delayed diversion groove. In some embodiments, the capturing disk 61 is coaxially arranged with the liquid separation cartridge base 43. The capturing disk 61 may be configured as a hollow structure to reduce its weight. A drive motor 63 may be disposed on one side of a disk surface of the capturing disk 61. The drive motor 63 may be connected to the liquid separation connection base via a connecting bracket. A drive member 64 may be disposed on the other side of the disk surface of the capturing disk 61. The drive motor 63 drives the capturing disk 61 to rotate through the drive member 64.

In some embodiments, a plurality of droplet capturing vanes 62 may be disposed on the outer side of the capturing disk 61, the plurality of droplet capturing vanes guiding the natural gas as the capturing disk 61 rotates.

The droplet capturing vane 62 is a vane capable of expanding a capturing range of the droplet capture assembly 6. In some embodiments, the droplet capturing vanes 62 are disposed at circumferentially evenly spaced intervals on the outer side of the capturing disk 61, and the droplet capturing vanes 62 may tap the droplets onto a chamber wall of the liquid recovery chamber 11, without relying on a centrifugal force. In some embodiments, an angle may be formed between a leaf surface of the droplet-capturing vanes 62 and the disk surface of the capturing disk 61, such that a negative pressure may be created when the capturing disk 61 drives the droplet capturing vanes 62 to rotate, which accelerates the natural gas to exit the liquid recovery chamber 11, thereby improving the overall efficiency of natural gas processing.

In some embodiments, the liquid separation cartridge base 43 is provided with a graphite heating electrode.

In some embodiments, the graphite heating electrode may heat the liquid on the liquid separation cartridge base 43, which may avoid a large amount of liquid backflow that causes obstruction to the channel of the natural gas and ensures the normal flow of the natural gas, thereby improving the overall processing efficiency of the natural gas.

The natural gas separation device in the present disclosure may separate solid impurities in the natural gas using the solid separation assembly. The buffer assembly in the solid separation assembly buffers the impact force of the solid impurities, effectively reducing their impact on the solid separation assembly and preventing damage. In some embodiments, the solid impurities are filtered by the solid separation assembly before passing through the liquid separation assembly, i.e., the liquid separation assembly does not contact with the solid impurities and is not subject to be damaged. In some embodiments, the natural gas passes through the solid separation assembly and the liquid separation assembly successively, enabling more targeted separation of solid impurities and water in the natural gas and achieving good separation results for the natural gas.

In some embodiments, merely by way of example, as shown in FIG. 3, the natural gas separation device further includes a baffle plate 8, the baffle plate 8 is disposed on the inner wall of the tank 1 above the air inlet 2, a height of a lower edge of the baffle plate 8 is lower than a height of a center of the air inlet 2.

The baffle plate is a plate-like structure configured to separate solid impurities from liquid in natural gas. For example, the baffle plate may include a flat plate, a beveled plate, a corrugated plate, etc.

In some embodiments, the natural gas entering through the air inlet 2 may hit the baffle plate, and solid impurities and liquid in the natural gas may be blocked from the baffle plate and fall into the front separation chamber 12 without rising with the natural gas inside the tank 1.

In some embodiments, the baffle plate may be provided as a corrugated plate, the corrugated plate having zigzagging corrugations, which may cause the natural gas to make multiple directional twists and turns when it hits the baffle plate, increasing a probability of collision between oil beads separated from the natural gas, increasing a speed of agglomeration between the oil beads, and providing a better separation effect.

In some embodiments, the material of the baffle plate may be a lipophilic-hydrophobic material or a hydrophilic-oleophobic material. For example, the lipophilic-hydrophobic material includes polyethylene, polyvinyl chloride, and polypropylene, etc.; and the hydrophilic-oleophobic material includes ordinary carbon steel, stainless steel, metallic aluminum, metallic zinc, ceramics, etc. It is to be understood that when the majority of the liquid in the natural gas is water, the material of the baffle plate is set as a hydrophilic-oleophobic material; and when the majority of the liquid in the natural gas is oil, the material of the baffle plate is set as a lipophilic-hydrophobic material.

In some embodiments, the shape of the baffle plate may change. For example, the baffle plate is provided with one or more creases, and the baffle plate may be bent into a wavy shape along the creases. In some embodiments, merely by way of example, as shown in FIG. 3, the baffle plate is provided with a driving device 9 on each side of the baffle plate along a length direction, and the driving device 9 controls a deformation of the baffle plate. In some embodiments, when the sides of the baffle plate along the length direction are stretched by the driving device 9, the baffle plate deforms into a flat plate shape; when the sides of the baffle plate are squeezed by the driving device 9, the baffle plate deforms into a wave plate.

In some embodiments, the driving device 9 includes a cylinder (or hydraulic cylinder), a linear actuator, a servo drive, etc., and the driving device 9 may utilize the cylinder (or the hydraulic cylinder) to control the stretching or squeezing of the baffle plate. In some embodiments, two hydraulic cylinders are disposed on both sides of the baffle plate along the length direction, and when the two hydraulic cylinders squeeze the baffle plate by driving different distances from the baffle plate, the baffle plate may accordingly form different wave plates with different bending degrees.

In some embodiments, when the baffle plate is a lipophilic-hydrophobic material, the driving device 9 may squeeze the baffle plate to deform the baffle plate into a wave plate, and the greater the strength of the squeezing of the baffle plate by the driving device 9, the more the bending degree of the wave plate increases, and the stronger the aggregation effect of the baffle plate on the oil beads.

In some embodiments, the bending degree of the baffle plate may be determined based on a prediction model, as described below.

In some embodiments, the tank 1 is provided with two air inlets 2, and corresponding baffle plates above the two air inlets 2 are a lipophilic-hydrophobic material and a hydrophilic-oleophobic material, respectively; and the tank 1 is provided with an oil-containing detecting device and a water-containing detecting device on the outer walls corresponding to the two air inlets 2, respectively.

The oil-containing detecting device is a device configured to detect a oil content in natural gas. For example, the oil-containing detecting device may include a dew point meter, a capacitive humidity sensor, etc.

The water-containing detecting device is a device for detecting a water content in natural gas. For example, the water-containing detecting device may include a particle counter, a spectrum analyzer, etc.

In some embodiments, the oil-containing detecting device and the water-containing detecting device may detect the natural gas to determine the oil content and the water content in the natural gas. When the oil content in the natural gas exceeds the water content, the natural gas may enter the tank 1 through the air inlet 2 corresponding to the baffle plate with the lipophilic-hydrophobic material. Conversely, when the water content in the natural gas exceeds the oil content, the natural gas may enter the tank 1 through the air inlet 2 corresponding to the baffle plate with the hydrophilic-oleophobic material.

In some embodiments, by detecting the water and oil content in the natural gas, a better air inlet 2 for the natural gas to enter the tank 1 may be determined, so that the natural gas, when entering the tank 1 through the air inlet 2, may impact on a baffle plate made of the corresponding material (i.e., the lipophilic-hydrophobic material or hydrophilic-oleophobic material) to provide a preliminary separation of the natural gas.

In some embodiments, merely by way of example, as shown in FIG. 2, the natural gas separation device includes a sensing system 31. The sensing system includes a first sensor and a second sensor, the first sensor is deployed at the exhaust port 3; the second sensor includes a pressure sensor and a solid-liquid adsorption unit, the pressure sensor is deployed at the exhaust port 3 and mechanically connected to the solid-liquid adsorption unit.

In some embodiments, wherein when the natural gas separation device operates, the processor is configured to: obtain a gas flow rate sequence from the first sensor and a mass increment sequence from the second sensor; generate a plurality of candidate adjustment parameters; determine, based on the gas flow rate sequence and the mass increment sequence, a predicted processing quality and a predicted processing efficiency corresponding to each of the plurality of candidate adjustment parameters, respectively, using a prediction model; the prediction model being a machine learning model; determine a target adjustment parameter based on the predicted processing quality and the predicted processing efficiency; and determine a target rotation rate and a target clamp angle of the capturing disk 61 based on a current rotation rate of the capturing disk, a current clamp angle, and the target adjustment parameter.

The first sensor is a sensor used to collect the flow rate of gas, where the flow rate represents a flow rate at which the natural gas is discharged from exhaust port 3. The first sensor may include a flow rate sensor.

The second sensor is a sensor for collecting a mass increment, the mass increment is an increase value in mass of the solid-liquid adsorption unit.

The solid-liquid adsorption unit is a device for adsorbing solid and liquid impurities remaining in natural gas. For example, the solid-liquid adsorption unit may include an activated carbon filter bed, silica gel adsorbents, or the like. In some embodiments, if the natural gas separation device fails to adsorb solid and liquid impurities in the natural gas effectively, the solid-liquid adsorption unit deployed at the exhaust port 3 may adsorb the remaining solid and liquid impurities in the natural gas. As a result, the mass of the solid-liquid adsorption unit may increase accordingly when the natural gas is discharged from exhaust port 3.

The pressure sensor is configured to determine the mass increment of the solid-liquid adsorption unit by detecting a change in pressure. For example, the difference between a pressure value at a start moment and a pressure value at an end moment detected by the pressure sensor during a certain set time period is an increment of the pressure value during the set time period, which may be used as a mass increment of the solid-liquid adsorption unit during the set time period.

In some embodiments, the pressure sensor is mechanically connected to the solid-liquid adsorption unit in a variety of ways, including but not limited to, flange connection, threaded connection, or the like.

The gas flow rate sequence is a sequence of airflow rates at multiple moments.

The mass increment sequence is a sequence of mass increments at multiple moments.

The candidate adjustment parameter is a parameter that may be used as the target adjustment parameter, and the target adjustment parameter is a parameter used to adjust the rotation rate and clamp angle of the capturing disk 61. In some embodiments, the target adjustment parameter may also include a parameter for adjusting the bending degree of the baffle plate, as described below. A description of the capturing disk 61 may be found as described above. In some embodiments, the candidate adjustment parameter includes a candidate adjustment value of rotation rate and a candidate adjustment value of clamp angle.

The candidate adjustment value of rotation rate is a parameter that may be used as an adjustment value of a target rotation rate for adjusting the rotation rate of the capturing disk 61.

The candidate adjustment value of clamp angle is a parameter that may be used as an adjustment value of a target clamp angle for adjusting the clamp angle of the capturing disk 61.

In some embodiments, the processor may generate the candidate adjustment parameters in multiple ways. For example, the processor may randomly combine adjustment values of historical target rotation rates and adjustment values of historical target clamp angles from the historical data to generate the candidate adjustment parameters.

The prediction model is a machine learning model configured to determine the predicted processing quality and the predicted processing efficiency. The predicted processing quality is a predicted quality of impurities adsorbed from the natural gas by the natural gas separation device, and the predicted processing efficiency is a predicted efficiency of the natural gas separation device in adsorbing and treating the impurities from the natural gas.

In some embodiments, the prediction model may be any one or a combination of a Deep Neural Network (DNN) model or other customized model structures.

In some embodiments, an input to the prediction model include a gas flow rate sequence, a mass increment sequence, a candidate adjustment parameter, a current rotation rate, and a current clamp angle of the capturing disk 61, and an output may include a predicted processing quality and a predicted processing efficiency corresponding to the candidate adjustment parameter. In some embodiments, the processor may determine the current rotation rate and the current clamp angle of the capturing disk 61 by a variety of manners. For example, the current rotation rate may be determined through a tachometer that is communicated with the processor, and the current clamp angle may be determined through an angle sensor that is communicated with the processor.

In some embodiments, the prediction model may be trained based on a plurality of first training samples with first labels by various manners (e.g., gradient descent). As an example only, the plurality of first training samples with the first labels may be input into an initial prediction model, a loss function may be constructed based on the first labels and results of the initial prediction model, and parameters of the initial prediction model may be iteratively updated based on the loss function. When the loss function of the initial prediction model satisfies a preset iteration condition, model training is completed and a trained prediction model is obtained. The preset iteration condition may be that the loss function converges, the count of iterations reaches a threshold, or the like.

In some embodiments, each of the first training samples includes a sample gas flow rate sequence, a sample mass increment sequence, a sample candidate adjustment parameter, a sample rotation rate and a sample clamp angle of a sample capturing disk 61, and the first training sample may be constructed based on historical data. The first label includes an actual processing quality and an actual processing efficiency of the natural gas separation device corresponding to the first training sample. In some embodiments, the processor may obtain an actual adjusted gas flow rate sequence and an actual adjusted mass increment sequence of the capturing disk 61 corresponding to the first training sample from the historical data, and then determine an actual adjusted processing quality and an actual adjusted processing efficiency as the first label. The actual adjusted gas flow rate sequence and the actual adjusted mass increment sequence of the capturing disk 61 may be taken as an average value over a predetermined time period after the actual adjustment. The correspondence between the gas flow rate sequence and the mass increment sequence and the processing quality and processing efficiency may be preset manually. If an average value of gas flow rates in the gas flow rate sequence is larger, the value of the manually labeled actual processing efficiency may be higher. if an average value of mass increments in the mass increment sequence is smaller, the value of the manually labeled actual processing mass increment may be higher.

The adjustment value of the target rotation rate is a parameter configured to adjust the rotation rate of the capturing disk 61.

The adjustment value of the target clamp angle is a parameter configured to adjust the clamp angle of the capturing disk 61.

In some embodiments, the processor may determine a combined processing effect of the candidate adjustment parameter based on the predicted processing quality and the predicted processing efficiency; and based on the combined processing effect, determine the target adjustment parameter of the capturing disk 61.

The combined treatment effect is an effect of adsorption treatment of impurities in natural gas by the natural gas separation device obtained based on the combination of the predicted processing quality and the predicted processing efficiency. In some embodiments, the combined treatment effect may be a summed value of the predicted processing quality and the predicted processing efficiency. In some embodiments, the processor determines a candidate adjustment parameter corresponding to a largest combined processing effect as the target adjustment parameter based on the combined processing effect corresponding to each candidate adjustment parameter. In some embodiments, a predicted processing quality corresponding to the largest combined processing effect is greater than a processing quality threshold, and a predicted processing efficiency corresponding to the largest combined processing effect is greater than a processing efficiency threshold. The processing quality threshold and the processing efficiency threshold may be manually preset.

In some embodiments, the processor may designate a sum of the current rotation rate of the capturing disk 61 and the adjustment value of the target rotation rate as the target rotation rate and a sum of the current clamp angle of the capturing disk 61 and the adjustment value of the target clamp angle as the target clamp angle.

The negative pressure within the liquid recovery chamber 11 may vary depending on the rotation rate and the clamp angle of the capturing disk 61, which affects the effectiveness of the natural gas separation device in recovering droplets, thereby affecting the efficiency and quality of the natural gas separation device in adsorbing impurities from natural gas. Accordingly, in some embodiments, the quality and efficiency of the natural gas separation device in adsorbing impurities from natural gas may be improved by determining the target adjustment parameter to adjust the rotation rate and the clamp angle of the capturing disk 61.

In some embodiments, the candidate adjustment parameter includes a candidate adjustment value of bending degree of the baffle plate, the target adjustment parameter includes a adjustment value of the target bending degree, and the input to the prediction model further includes a current bending degree of the baffle plate.

The bending degree is a parameter characterizing the extent to which the baffle plate is bent by the extrusion of the driving device 9. In some embodiments, the processor may obtain a current bending degree of the baffle plate in various ways. For example, the baffle plate is affixed with a strain gauge, the strain gauge is connected to the processor in communication. When the baffle plate is subjected to extrusion and bending, the strain gauge may deform, a resistance value of the strain gauge may change, and the change in the resistance value of the strain gauge is the current bending degree of the baffle plate.

In some embodiments, the processor may determine a target bending degree of the baffle plate based on the current bending degree of the baffle plate and an adjustment value of the target bending degree. The manner of determining the target bending degree is similar to the manner of determining the target rotation rate and the target clamp angle, referring to above description.

In some embodiments, the first sample further includes a sample bending degree of a sample baffle plate when the input to the prediction model further includes the current bending degree of the baffle plate.

A description of the bending degree of the baffle plate may be found above. The bending degree of the baffle plate is positively related to the curvature of the wave structure produced by the extrusion of the baffle plate, and the curvature affects the probability of collision of oil droplets separated from the natural gas on the baffle plate. In some embodiments, by determining the adjustment value of the target bending degree, the baffle plate may be adjusted to a more appropriate bending degree, increasing the probability of collision of oil droplets on the baffle plate, accelerating a rate of agglomeration between the oil droplets, and improving the quality and efficiency of the natural gas separation device in adsorbing liquid impurities from natural gas.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A natural gas separation device, comprising:
a tank, providing with an air inlet, an exhaust port, and a liquid discharge port;
a liquid separation assembly, disposed in the tank and dividing an internal space of the tank into a front separation chamber and a liquid recovery chamber, the liquid separation assembly being provided with a liquid return channel for connecting the front separation chamber and the liquid recovery chamber, wherein the liquid recovery chamber is connected to the exhaust port, and the front separation chamber is connected to the air inlet and the liquid discharge port; and
a solid separation assembly, disposed in the front separation chamber and connected to the liquid separation assembly, wherein a solid separation cartridge of the solid separation assembly is configured with a buffer assembly; the buffer assembly stores energy when the solid separation cartridge is impacted in a filtration direction of the solid separation cartridge; wherein the solid separation assembly includes a solid separation connection base and a solid separation cartridge base; the solid separation connection base is connected to the liquid separation assembly; and the solid separation cartridge base is slidably connected to the solid separation connection base, the buffer assembly is disposed between the solid separation connection base and the solid separation cartridge base, and the solid separation cartridge is disposed on the solid separation cartridge base;
a droplet capture assembly, disposed in the liquid recovery chamber, wherein the droplet capture assembly is connected to the tank; the droplet capture assembly includes a capturing disk, the capturing disk rotates to throw captured droplets onto a chamber wall of the liquid recovery chamber; a plurality of droplet capturing vanes are disposed on an outer side of the capturing disk, and the plurality of droplet capturing vanes guide a natural gas when the capturing disk rotates, wherein an is formed between a leaf surface of the droplet capturing vanes and a disk surface of the capturing disk;
wherein:
the liquid separation assembly includes a liquid separation connection base, a liquid separation cartridge base, and a plurality of liquid separation cartridges;
the liquid separation connection base is connected to the tank, and the liquid separation connection base is provided with a diversion chamber connected to the front separation chamber and the liquid recovery chamber;

the plurality of liquid separation cartridges are disposed on the liquid separation cartridge base; and the liquid separation cartridge base is connected to the liquid separation connection base and disposed in the diversion chamber, a gap is disposed between the liquid separation cartridge base and the liquid separation connection base to form a diversion channel for directing the natural gas to the plurality of liquid separation cartridges wherein each of the liquid separation cartridges includes a support column and a delayed diversion member; the support column is disposed on the liquid separation cartridge base; and the delayed diversion member is disposed on the support column, and the delayed diversion member includes a delayed diversion groove with; wherein the extension direction of the delayed diversion groove is helical.

2. The natural gas separation device according to claim 1, wherein the plurality of liquid separation cartridges are disposed on the liquid separation cartridge base.

3. The natural gas separation device according to claim 1, wherein the liquid separation cartridge base is provided with a graphite heating electrode.

4. The natural gas separation device according to claim 1, wherein the liquid discharge port is provided with a blowdown valve.

* * * * *